W. P. COHOE.
METHOD OF MAKING A GLUCOSE LIKE PRODUCT FROM CELLULOSIC AND LIGNEOUS MATERIALS.
APPLICATION FILED APR. 14, 1910.
985,726.
Patented Feb. 28, 1911.
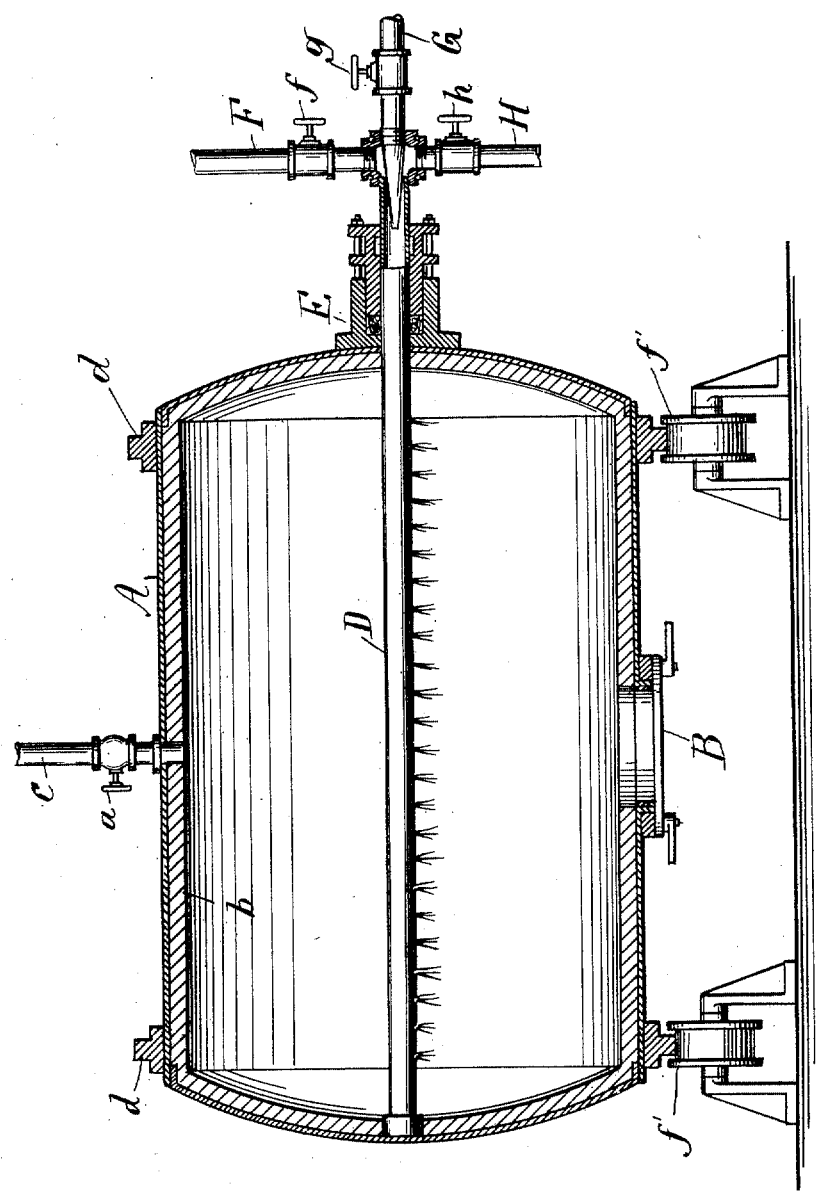

UNITED STATES PATENT OFFICE.

WALLACE P. COHOE, OF TORONTO, ONTARIO, CANADA.

METHOD OF MAKING A GLUCOSE-LIKE PRODUCT FROM CELLULOSIC AND LIGNEOUS MATERIALS.

985,726. Specification of Letters Patent. Patented Feb. 28, 1911.

Application filed April 14, 1910. Serial No. 555,442.

*To all whom it may concern:*

Be it known that I, WALLACE P. COHOE, a British subject, residing at and whose post-office address is 148 Van Horne street, city of Toronto, county of King, Province of Ontario, in the Dominion of Canada, have invented certain new and useful Improvements in Methods of Making a Glucose-Like Product from Cellulosic and Ligneous Materials; and I do hereby declare the following to be a full, clear, and exact description of the invention, such as will enable others skilled in the art to which it appertains to make and use the same.

My invention relates to certain new and useful improvements in obtaining a glucose-like product from cellulosic material and ligneous material; that is to say, from cellulose and from the lignins or both, as the case may be, and especially from sawdust and other waste wood products.

The conversion of the available constituents of sawdust and like materials into glucose-like products involves the use of a suitable hydrolyzing agent, such as sulfuric acid, sulfurous acid, hydrochloric acid or mixtures thereof. Of these acids, sulfurous and hydrochloric acid are volatile, and, for that reason, as will hereinafter more fully appear, have superior and striking advantages in the carrying out of my present invention, although, in its broadest aspect my invention is capable of being practiced with satisfactory though inferior results, with the use of sulfuric acid.

Whatever the hydrolyzing agent employed, former processes for the production of a glucose-like product from sawdust and like materials have encountered the difficulty that under the conditions of practice employed, the output has been interfered with and cut down by the formation of reversion products.

One of the objects of my present invention is to reduce the formation of these reversion products to a low minimum, and, in fact, as far as possible to avoid them altogether.

Other objects of my invention are to substantially diminish the time required for the conversion of any given charge, and to drive off and collect, in a preliminary way, and as a separate by-product, uncontaminated with the hydrolyzing acid, the larger part of the acetic acid and the like, available in the sawdust.

In carrying out my invention, I place the charge of sawdust or like material, with its normal content of moisture (which will usually vary from thirty to fifty per cent. by weight of the dry wood) in a suitable digester, and subject it therein, under pressure, to the action of live steam. The admission of the live steam, say at a pressure of one hundred (100) pounds, is continued until such time as the volatile organic compounds resulting from the action of the steam on the wood, are in large proportion driven off, these organic compounds in the case of hard wood consisting mainly of acetic acid. The action of the steam upon the material is also, in part at least, a hydrolytic action. The temperature of the sawdust is, of course, likewise raised by the admission of the live steam, and, when its admission has been continued for a sufficient time to produce the larger portion of the available acetic acid, the vapors that have collected in the digester above the charge are blown off with a sudden reduction of pressure and are led into a suitable condensing apparatus, for the recovery of the acetic acid, as a by-product. After the vapors of acetic acid have thus been blown off, it is found that the sawdust, in consequence of the sudden release of pressure, has been notably opened up throughout its entire mass of particles, so as to be more readily penetrable by the steam and acid subsequently to be introduced. Moreover, it is found that whether the original content of moisture in the sawdust was below or above, say 50%, this percentage of moisture, after the preliminary action of the steam and the blowing off of the vapors, is substantially uniform and in the neighborhood of 50% by weight of the dry wood; that is, the amount of moisture in the charge is increased if below the average referred to and decreased if above that average. This is of importance for regularity of commercial operations, inasmuch as it insures uniformity of conditions, in so far as the moisture content is concerned at the beginning of the next step in the process. At this stage, also, the temperature of the sawdust is approximately that of boiling water, or in that neighborhood, say of from 90° C. to 100° C. After the release of pressure and extrication of vapors the digester is again closed and live steam is again admitted, at a pressure of say 100 pounds, until the pressure within the digester rises to from 60 to 90 pounds. By this expedient, the charge is brought to a temperature appropriate to the maximum action of the acid to be introduced, so that the conditions are at once at hand for the immediate and efficient action of the hydrolyzing acid. Accordingly, when live steam has been admitted for a sufficient length of time to bring the pressure, and consequently the temperature, within the digester to the range indicated, the hydrolyzing acid is admitted.

In my preferred practice, the hydrolyzing acid employed is hydrochloric acid in as highly concentrated a condition as is available for commercial purposes, as, for instance, commercial hydrochloric acid containing from say 28% to 35% of real HCl. The hydrochloric acid, being volatile, may be injected by the live steam in the form of a vapor, and is at once disseminated throughout the entire mass of the charge. When a sufficient quantity of real hydrochloric acid has been thus injected in vaporous form (say from ½% to 2% of the weight of the dry wood content of the charge), the supply of live steam and of acid is discontinued, and the further conversion of the wood is obtained by permitting the charge to remain in the atmosphere of steam and acid vapor until the desired result is obtained. In this last stage of the operation, the process is materially hastened and the output increased by raising the pressure within the digester to say 125 pounds, preferably by introducing a volume of compressed air, from a suitable source of supply, and without raising the temperature. As soon as the period of conversion has elapsed, the vapors contained in the digester are blown off by a release of pressure. These vapors contain practically all of the volatile hydrochloric acid which may, therefore, be recovered in a suitable condenser or absorber.

It is strongly characteristic of the employment of the volatile hydrochloric acid in my process that, after the blowing off operation the charge will be found to be almost absolutely devoid of free acid. In fact, only the slightest traces of free acid are capable of detection. Furthermore, in the operation, the sawdust has been discolored but very slightly and the syrups resulting from the extraction of the digested charge are light in color and not dark (almost black) as is the case when sulfurous and sulfuric acids are employed.

In the accompanying drawing I have illustrated in vertical section a suitable form of apparatus adapted for the practice of my invention.

Referring to the drawing, A indicates a rotary cylinder or digester provided with a charging door B and with a blow-off pipe c, having a controlling valve a. The cylinder is provided internally with a lining b of a material resistant to the action of hydrochloric acid, as, for instance, asbestos impregnated with one of the modern synthetic plastics derived from the condensation of phenols with formaldehyde, such as "bakelite". The cylinder is further provided with bands or tires d and is mounted to rotate in any suitable manner upon supporting rollers f, its rotation being effected by any appropriate driving mechanism, not shown. The cylinder is likewise provided with an axial pipe D which may be made of bakelite or which may be of metal coated with bakelite or other appropriate material resistant to hydrochloric acid, and this pipe is provided with a suitable number of perforations along its length. If desired, the cylinder may be further provided with longitudinal wings along its interior side walls for lifting and dropping the material during the rotation of the apparatus. The apparatus is therefore a drum digester. Its axial pipe D is intended to be stationary during the revolution of the drum, and a stuffing box E is provided whose main elements may conveniently be made of bakelite mixed with graphite, or of metal lined with bakelite or similar acid proof enamel. The pipe D is provided with three branches F, G, H, each having a cut-off valve f, g, h, respectively.

In operation, the drum digester will be filled three-fourths full of sawdust. The preliminary stage of the operation, as has been hereinbefore indicated, will then consist in first closing all of the cut-off valves except the valve g, through which the very high pressure and very dry steam at say 100 pounds pressure is introduced. The digester is then set in slow rotation and the admission of the live steam is continued until the desired amount of acetic acid and the like has been produced from the sawdust. This time will vary with the amount of material to be treated and its initial temperature and content of moisture, but in ordinary practice will continue for say ten minutes. The rotation of the digester is then interrupted and the pressure released, the acetic acid vapors and the like being blown off into any suitable condensing or absorbing apparatus. At the end of this stage of the operation, a little more live steam may be introduced to advantage to expel the acid vapors the more completely. It is found that by this preliminary operation an amount of real acetic acid equivalent to from 1% to 2% of the weight of the dry wood content of the charge can be obtained, the effect on the sawdust being to slightly brown it but to a degree that is not material. After the acetic acid vapors have thus been blown off it is found that the sawdust is opened up in texture and in a condition making it particularly permeable to the live steam and hydrolyzing acid afterward to be admitted, and that the amount of moisture is practically uniform throughout the mass, varying somewhat with the conditions of blowing off, but being approximately 50% by weight of the dry wood. The digester is then again started into rotation. The steam is turned on at 100 pounds pressure, as before, and the pressure is allowed to rise in the digester until it attains a range from 60 pounds to 90 pounds, and preferably as near 90 pounds as is readily attainable. At this point, the valve $f$ in the pipe F supplying the hydrochloric acid is opened and the injecting action of the steam carries the acid along into the pipe D and out through the openings of the pipe in the form of a vapor, which immediately permeates the mass throughout. Admission of the hydrochloric acid is continued until an amount is admitted equal to say $\frac{1}{2}\%$ to 2% of the dry weight of the wood. The valves $f$ and $g$ are then closed and the rotation of the digester is continued, for from 10 to 15 minutes, the total period from the time of the second blowing in of the steam being about 30 minutes. The rotation of the digester is then interrupted, the vaporous contents are blown off to suitable condensing or absorbing apparatus for the hydrochloric acid and the like, and a small amount of steam is permitted to sweep out the last portions of the vapors. When the pressure is entirely reduced it is found that the charge is so free from hydrochloric acid that it but barely gives a reaction with litmus paper. After the steam has been cut off, in the latter part of the operation, the pressure may be increased within the digester to advantage, as hereinbefore stated. This may be done by opening the cock $h$ in the pipe H leading from a supply of compressed air, so that the pressure within the digester may be raised, by this expedient, to say 125 pounds. Finally the contents of the digester may be dumped through the dumping door B and the glucose-like product may then be extracted by means of hot water, and used as such; or the product thus extracted may be fermented; or, in lieu thereof, a mash may be made from the entire mass, and fermented, without extraction.

The residue left over after the glucose-like product has been extracted by a first operation in the digester may, to advantage, be subjected to a further treatment, in the same way, and an additional quantity of the glucose-like product may be obtained therefrom, which may in like manner be extracted by means of hot water. This successive treatment of the same mass enables the yield of the glucose-like product to be largely increased, thereby giving correspondingly improved commercial results.

What I claim is:—

1. The method of obtaining a glucose-like product from sawdust and the like, which consists in first digesting the material under pressure and at a high temperature by means of live steam, until the conditions for speedy conversion are realized, and then subjecting it to the action of a hydrolyzing acid; substantially as described.

2. The method of obtaining a glucose-like product from sawdust and the like, which consists in first digesting the material under pressure and at a high temperature by means of live steam, until the conditions for speedy conversion are realized, and then subjecting it to the action of a volatile hydrolyzing acid; substantially as described.

3. The method of obtaining a glucose-like product from sawdust and the like, which consists in first digesting the material under pressure and at a high temperature by means of live steam, until the conditions for speedy conversion are realized; and then subjecting it to hydrochloric acid in a vaporous state; substantially as described.

4. The method of obtaining a glucose-like product from sawdust and the like, which consists in preliminarily digesting the same under pressure, by means of live steam, until the larger proportion of the available acetic acid is produced therefrom, blowing off the acetic acid vapors, and then further digesting the mass, under pressure and at a high temperature in the presence of a hydrolyzing acid; substantially as described.

5. The method of obtaining a glucose-like product from sawdust and the like, which consists in preliminarily digesting the same under pressure, by means of live steam, until the larger proportion of the available acetic acid is produced therefrom, blowing off the acetic acid vapors, then further digesting the mass under pressure, by means of live steam, until the conditions within the digester as to pressure and temperature are suitable for the speedy conversion of the mass, and then effecting the desired conversion by admitting a hydrolyzing acid into the digester; substantially as described.

6. The method of obtaining a glucose-like product from sawdust and the like, which consists in preliminarily digesting the same under pressure, by means of live steam until the larger proportion of the available acetic acid is produced therefrom, blowing off the acetic acid vapors, then further digesting the mass under pressure, by means of live steam, until the conditions within the digester as to pressure and temperature are suitable for speedy conversion of the mass, and then effecting the desired conversion by admitting hydrochloric acid into the digester in a vaporous condition; substantially as described.

7. The method of obtaining a glucose-like product from sawdust and the like, which consists in preliminarily digesting the same under pressure, by means of live steam, until the larger proportion of the available acetic acid is produced therefrom, blowing off the acetic acid vapors, then further digesting the mass, under pressure, by means of live steam and by means of hydrochloric acid in a vaporous state, until the desired conversion has been attained, and finally blowing off the ultimate vapors, thereby leaving a product containing only the slightest traces of free acid; substantially as described.

8. The method of obtaining a glucose-like product from sawdust and the like, which consists in preliminarily digesting the same under pressure by means of live steam, until the larger proportion of the acetic acid is expelled therefrom, blowing off the acetic acid vapors, then further digesting the mass, under pressure, by means of live steam and by means of hydrochloric acid in a vaporous state, and further raising the pressure in the digester without raising the temperature by admitting a quantity of air under higher pressure than the steam; substantially as described.

9. In the method of obtaining a glucose-like product from sawdust and the like, by subjecting the same, under pressure, to the action of live steam and a hydrolyzing agent, the step of increasing the pressure, without increasing the temperature, by means of compressed air at a higher pressure than the steam; substantially as described.

10. The method of obtaining a glucose-like product from sawdust and the like, which comprises first effecting a partial hydrolyzation thereof by digesting under pressure and extracting the products thus made and thereafter subjecting the residual material to the further hydrolyzing action of hydrochloric acid; substantially as described.

11. In the manufacture of a glucose-like product from sawdust and the like, the process which comprises digesting the material with steam under pressure to effect a partial conversion, suddenly releasing the pressure to remove volatile products and open the texture of the material, and then subjecting the material to the action of a hydrolyzing acid.

12. In the manufacture of a glucose-like product from sawdust and the like, the process which comprises preliminarily digesting the material with live steam under pressure until the greater part of the available acetic acid is produced therefrom, blowing off the acetic acid vapors, then further digesting the mass under pressure and at a high temperature in the presence of a hydrolyzing acid, removing the products formed and repeating the acid hydrolyzing treatment one or more times upon the residual material to obtain more complete conversion.

In testimony whereof I affix my signature, in presence of two witnesses.

WALLACE P. COHOE.

Witnesses:
 JOHN C. PENNIE,
 WILLIAM H. DAVIS.

---

Copies of this patent may be obtained for five cents each, by addressing the "Commissioner of Patents, Washington, D. C."